(12) United States Patent
Maeda

(10) Patent No.: US 8,036,479 B2
(45) Date of Patent: Oct. 11, 2011

(54) IMAGE PROCESSING APPARATUS AND METHOD, AND STORAGE MEDIUM FOR CONTROLLING GRADATION OF MOVING IMAGES

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 11/953,638

(22) Filed: Dec. 10, 2007

(65) Prior Publication Data

US 2008/0152223 A1 Jun. 26, 2008

(30) Foreign Application Priority Data

Dec. 22, 2006 (JP) ................................. 2006-346195

(51) Int. Cl.
*G06K 9/40* (2006.01)
(52) U.S. Cl. ....................................... 382/254; 382/260
(58) Field of Classification Search .................. 382/103, 382/162, 167, 168–172, 274; 358/461, 518, 358/521, 522, 448, 3.06, 3.21, 3.22
See application file for complete search history.

(56) References Cited

U.S. PATENT DOCUMENTS

| | | | |
|---|---|---|---|
| 6,148,103 A * | 11/2000 | Nenonen | 382/169 |
| 6,493,468 B1 | 12/2002 | Matsuura | |
| 6,952,503 B2 | 10/2005 | Matsuura | |
| 7,110,455 B2 * | 9/2006 | Wu et al. | 375/240.16 |
| 7,245,764 B2 * | 7/2007 | Nishizawa | 382/168 |
| 7,286,716 B2 * | 10/2007 | Kim | 382/254 |
| 7,454,078 B2 * | 11/2008 | Ramamurthy | 382/254 |
| 7,639,878 B2 * | 12/2009 | Ibrahim et al. | 382/190 |
| 7,664,319 B2 * | 2/2010 | Toyoda et al. | 382/167 |
| 7,751,484 B2 * | 7/2010 | Jia et al. | 375/240.29 |
| 2004/0008903 A1 * | 1/2004 | Kim | 382/274 |
| 2005/0128355 A1 * | 6/2005 | Kang et al. | 348/606 |

FOREIGN PATENT DOCUMENTS

JP 11-317959 A 11/1999

* cited by examiner

*Primary Examiner* — Gregory M Desire
*Assistant Examiner* — Andrae S Allison
(74) *Attorney, Agent, or Firm* — Canon U.S.A. Inc., I.P. Division

(57) ABSTRACT

An image processing apparatus includes an input unit configured to input a moving image on a frame-by-frame basis, a feature quantity calculating unit configured to calculate a feature quantity of the input image, a storing unit configured to store the feature quantity corresponding to a plurality of frames, a motion determination unit configured to determine whether an object of the input image is moving or motionless, a smoothing unit configured to smooth feature quantity of a plurality of images in accordance with a result of determination made by the motion determination unit, and an image correcting unit configured to correct the input image in accordance with an output from the smoothing unit.

10 Claims, 10 Drawing Sheets

IMAGE PROCESSING APPARATUS AND METHOD, AND STORAGE MEDIUM FOR CONTROLLING GRADATION OF MOVING IMAGES

BACKGROUND OF THE INVENTION

1. Field of the Invention

The present invention relates to an image processing apparatus, an image processing method, and a storage medium. In particular, the present invention relates to an image processing technique that controls a gradation of moving images.

2. Description of the Related Art

Conventionally, various image correction techniques for controlling contrast, white balance, color balance, etc. of still image data have been proposed. One of the image correction techniques is discussed in Japanese Patent Application Laid-Open No. 11-317959 (see FIG. 9).

Japanese Patent Application Laid-Open No. 11-317959 discusses a method for checking features of an image based on a color bias ratio in a highlighted portion of the image, adjusting the degree of white balance correction in accordance with the determined features and optimizing contrast, highlights, and shadow to faithfully reproduce a color of the object.

On the other hand, such an image correction technique for correcting contrast, white balance, color balance, etc. of an image is also necessary for a moving image, similar to a still image.

However, when the above described image correction technique is applied to moving images, since the image correction method corrects an image on a frame-by-frame basis, a correction value would differ between adjacent frames, which causes a problem in that the correction value difference is perceived as a flicker (flicker of an image) by a viewer. In particular, such a change caused by the image correction occurs in a motionless portion (e.g., background) of the moving image. Thus, the change is perceived as image degradation.

SUMMARY OF THE INVENTION

The present invention is directed to an image processing apparatus capable of suppressing flicker and performing appropriate correction in accordance with motion of a moving image, and an image processing method and a storage medium used for the apparatus.

According to an aspect of the present invention, an image processing apparatus includes an input unit configured to input a moving image on a frame-by-frame basis, a feature quantity calculating unit configured to calculate feature quantity of the input image, a storing unit configured to store the feature quantity corresponding to a plurality of frames, a motion determination unit configured to determine whether an object of the input image is moving or motionless, a smoothing unit configured to smooth feature quantity of a plurality of images in accordance with a result of determination made by the motion determination unit, and an image correcting unit configured to correct the input image in accordance with an output from the smoothing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
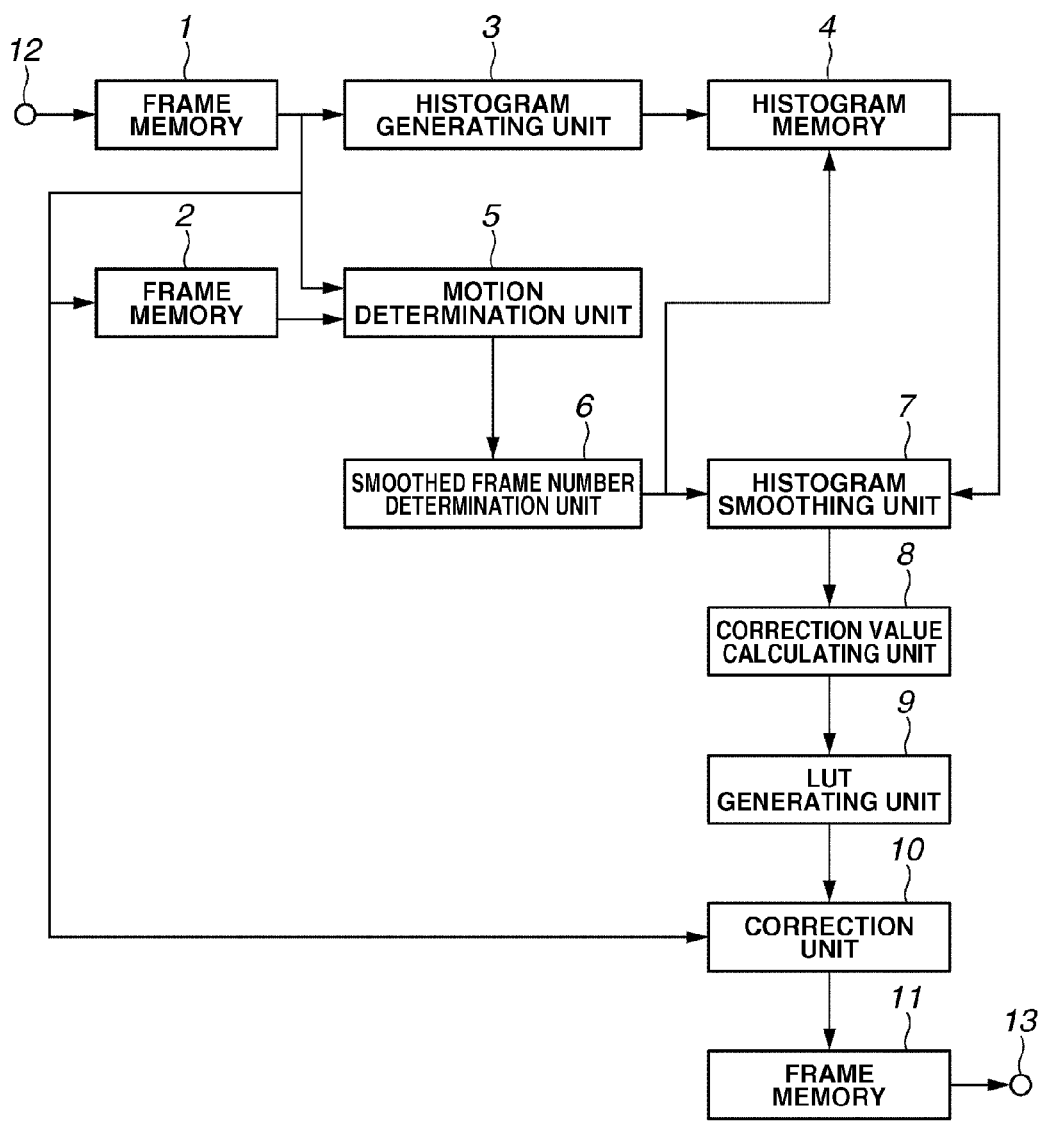
FIG. 1 is a block diagram illustrating an exemplary configuration of an image processing apparatus according to a first exemplary embodiment of the present invention.

FIG. 1 illustrates an exemplary configuration of an image processing apparatus configured to correct an image according to a first exemplary embodiment of the present invention.

Frame memories 1 and 2 store a moving image on a frame-by-frame basis. The frame memory 1 stores an input image, and the frame memory 2 stores an image of a frame previous to the input image. A histogram generating unit 3 calculates an appearance frequency of each luminance value of the input image stored in the frame memory 1, to generate a histogram. A histogram memory 4 stores histograms generated by the histogram generating unit 3 for each image. The histogram memory 4 can store N (N is 2 or more) frames from the input image. That is, the memory stores a histogram of up to an (N−1)th frame previous to the input image. A motion determination unit 5 compares an input image of the frame memory 1 with an image of a previous frame stored in the frame memory 2, and determines whether the input image is a motionless image (still state) that includes almost no motion, or a moving image (moving state) that includes any motion. A smoothed frame number determination unit 6 determines the number of frames to be smoothed depending on the moving state or motionless state. A histogram smoothing unit 7 first reads histogram data corresponding to the number of frames to be smoothed which is determined by the smoothed frame number determination unit 6, from the histogram memory 4. Further, the histogram smoothing unit 7 reads a frequency of each luminance value of an image, adds the frequency data, and divides the addition result by the number of frames to be smoothed. A correction value calculating unit 8 calculates a correction value used for performing correction based on a smoothed histogram. Regarding the type and calculation method of the correction value, general types and methods can be used. A look-up table (LUT) generating unit 9 generates table data used for correction based on the calculated correction value. A correction unit 10 stores the table data generated by the LUT generating unit 9 and reads pixel data on a pixel-by-pixel basis from the frame memory 1 to correct the input image. A frame memory 11 stores the corrected image. An input terminal 12 inputs a moving image. An output terminal 13 outputs the corrected image.

Figure 2:
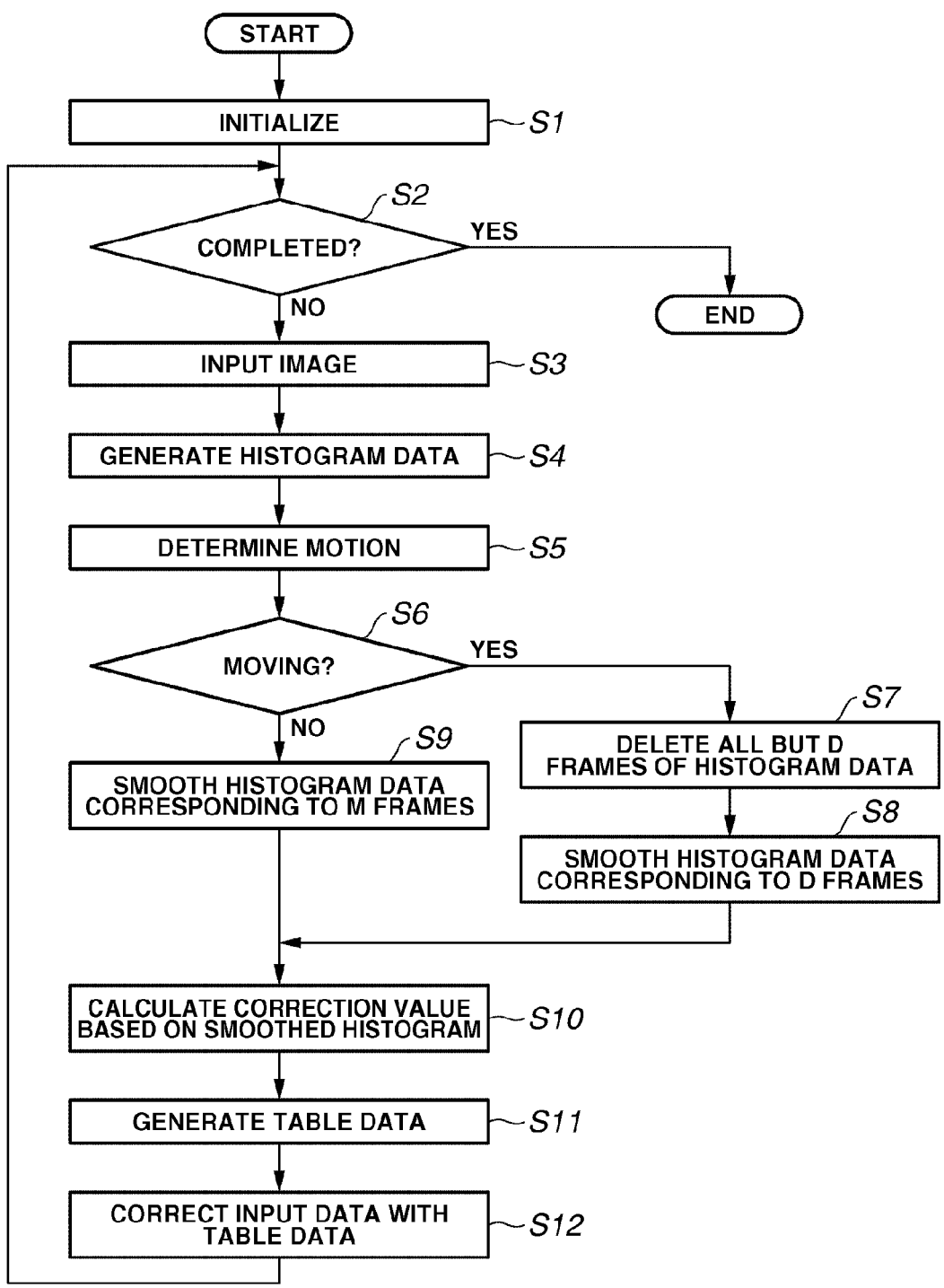
FIG. 2 is a flowchart illustrating image correction processing of the first exemplary embodiment of the present invention.

FIG. 2 is a flowchart illustrating image correction processing of the present exemplary embodiment.

In step S1, each processing unit and memory is initialized. In step S2, it is determined whether target images are all processed. If already processed, the processing is finished; otherwise, the processing advances to step S3.

In step S3, an image input from the input terminal 12 is stored in the frame memory 1. In step S4, the histogram generating unit 3 generates a histogram of the image stored in the frame memory 1. Now, generation of a histogram by the histogram generating unit 3 will be described below. Hp represents a value corresponding to each luminance value P on a histogram. When an image of a Tth (T≧1) frame is input, histogram $H_{TP}$ corresponding to every luminance value P (0 to 255) is reset to 0.

$$H_{TP}=0(P=0\ldots 255) \quad (1)$$

Histogram data is generated by counting luminance values. Where Pi represents a luminance value of an i-th pixel of the input image, $$H_{TPi}=H_{TPi}+1 \quad (2)$$

After the completion of counting values of all pixels in one image, the histogram generating unit 3 stores the generated histogram data in a predetermined area of the histogram memory 4. That is, a value of the histogram $H_{TP}$ is stored.

For ease of illustration, the maximum possible number of frames M to be stored in the histogram memory 4 is set to "5" in the present exemplary embodiment, but the invention is not limited to this value.

In addition, in the present exemplary embodiment, input luminance is described as 8-bit data per pixel for ease of description, but the present invention is not limited to the 8-bit data.

In step S5, the motion determination unit 5 checks an input image stored in the frame memory 1 and an image stored in the frame memory 2 to determine whether the input image is a moving image (moving state) or a motionless image (motionless state). In the moving state, an object itself moves as a moving image, or the object and background are moved in accordance with operations (zooming, panning, tilting, etc.) of an image pickup device. In the motionless state, the object and background stand still and the image pickup device also remains stationary during photographing. Various methods are conceivable as a determination method. In the present exemplary embodiment, pixels are sampled in the same position and their difference is determined. The sum of absolute value of differences is calculated and compared with a threshold value. If the sum is larger than the threshold value, the image is determined to be in a moving state. If the sum is smaller than the threshold value, the image is determined to be in a motionless state. In another method, a motion vector is determined by block-matching or the like, and the state of image can be determined in accordance with the vector. The result of determination made by the motion determination unit 5 is input to the smoothed frame number determination unit 6.

In step S6, if the motion determination unit 5 determines that the input image is in the moving state, the processing advances to step S7. If it is determined that the input image is in the motionless state, the process proceeds to step S9. The smoothed frame number determination unit 6 determines the number of frames of an input image to be smoothed in the histogram smoothing unit 7. If the motion determination unit 5 determines that the input image is in the moving state in step S6, the number of frames to be smoothed is D (D<N). If the motion determination unit 5 determines in step S6 that the input image is in the motionless state in step S6, the number of frames to be smoothed is M (M≦N). The numbers of frames M and D are fixed ones and the number of frames D in the moving state is usefully smaller than the number of frames M in the motionless state. In the present exemplary embodiment, the number of frames D is 3, and the number of frames M is 5. However, the present invention is not limited to these numbers.

If the input image is determined to be in the moving state in step S6, the number of frames to be smoothed is D. In step S7, the histogram smoothing unit 7 deletes histogram data of all frames but D frames in the histogram memory 4. Then, in step S8, histogram data corresponding to D frames is input into the histogram smoothing unit 7, and an appearance frequency of each luminance value of the input histogram data is calculated, and calculation results are added. Then, an average value is calculated and smoothed. If the histogram memory 4 only stores a histogram of less than D frames, smoothing is carried out with a number of the stored frames. That is, the smoothed histogram $H_{TP}$ corresponding to the smoothed luminance value P is obtained by a following expression.

$$H_{TP}=(\Sigma^{T}_{t=(T-d+1)}H_{tP})/d \quad (3)$$

where if D frames or more are stored: d=D;
if less than D frames are stored: d=the number of stored frames On the other hand, if the input image is determined to be in the motionless state in step S6, the number of frames to be smoothed is M. In step S9, histogram data of M frames is input into the histogram smoothing unit 7, an appearance frequency of each luminance value of the input histogram data is calculated, and calculation results are added. Then, an average value is calculated for smoothing. However, if the histogram memory 4 stores only a histogram of less than M frames, smoothing is carried out with the stored frames. That is, the smoothed histogram $H_{TP}$ corresponding to the smoothed luminance value P is derived from a following expression.

$$H_{TP}=(\Sigma^{T}_{t=(T-M+1)}H_{tP})/m \quad (4)$$

where if M frames are stored: m=M;
if less than M frames are stored: m=the number of stored frames In step S10, the smoothed histogram (from step S8 or step S9) is input into the correction value calculating unit 8, and a correction value is calculated.

An example of a method of calculating a correction value is described below. First, "245" is set as a highlight point (HP) after correction, and "10" is set as a shadow point (SP) after correction. It is assumed that a highlight area accounts for 99 to 100% of the total area, and a shadow area accounts for 0 to 1%.

Figure 10:
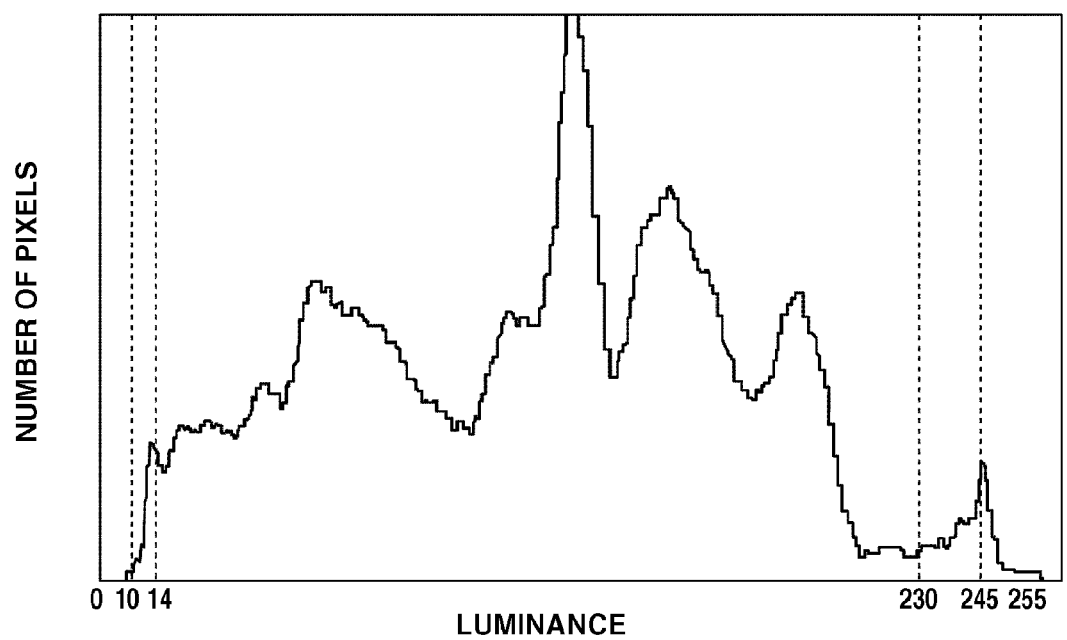
FIG. 10 is a diagram illustrating an example of a histogram according to the exemplary embodiment of the present invention.

Next, a highlight point (LH) of an image is determined based on the smoothed histogram. In this example, LH refers to the lowest luminance in the highlight area of an image. Thus, in a histogram example of FIG. 10, a luminance range corresponding to the highlight area of 99 to 100% is 230 to 255, therefore, LH is "230".

Next, a shadow point (LS) of an image is calculated based on the smoothed histogram. In this example, LS refers to the highest luminance in the shadow area of an image. Thus, in a histogram example of FIG. 10, a luminance range corresponding to the shadow area of 0 to 1% is 0 to 14, therefore, LS is "14".

As a result of the above processing, a highlight point (LH) of an image, a highlight point (HP) after correction, a shadow point (LS), and a shadow point (SP) after correction are determined to be correction values.

In step S11, the calculated correction value is input into the LUT generating unit 9, and a relation between the input value and a value of a corrected image is generated as table data.

In step S12, the generated table data is input into the correction unit 10, and an input image from the frame memory 1 is corrected in accordance with the input table data. The corrected input image is stored in a frame memory 11. Finally, the data in the frame memory 11 is output via a terminal 13, and the data in the frame memory 1 is transferred to the frame memory 2. Processing then returns to step S2 to determine if processing is complete.

In the series of operations, a histogram of an image in a moving state is smoothed with a smaller number of smoothed frames than an image in a motionless state, so that flicker can be suppressed and appropriate correction is performed in accordance with a state of the moving image.

Second Exemplary Embodiment

Figure 3:
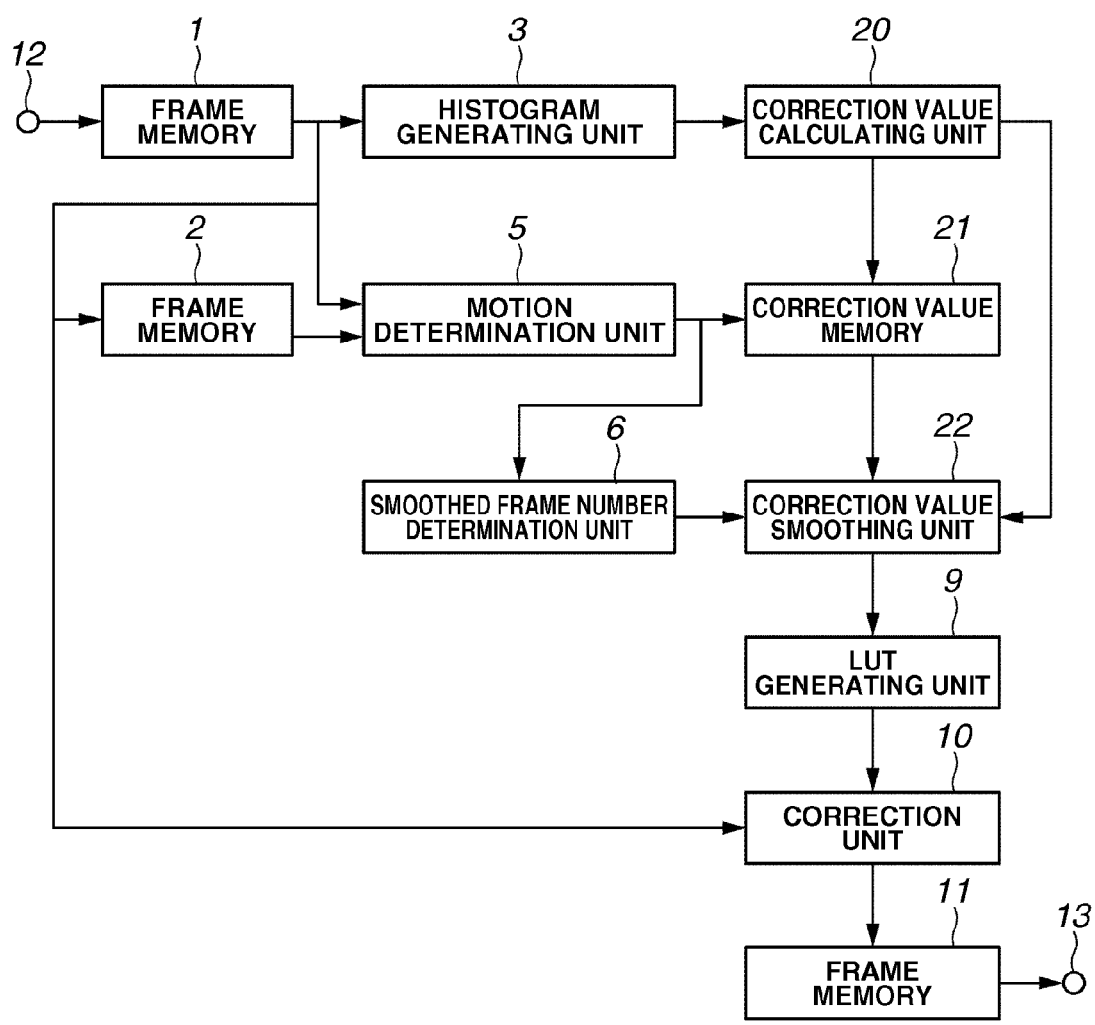
FIG. 3 is a block diagram illustrating an exemplary configuration of an image processing apparatus according to a second exemplary embodiment of the present invention.

FIG. 3 illustrates an example of a configuration for image correction in an image processing apparatus according to a second exemplary embodiment of the present invention.

In the first exemplary embodiment, the number of frames to be smoothed is determined on the basis of motion determination made by the motion determination unit 5, and a histogram of the determined number of frames is smoothed. In the present exemplary embodiment, the number of frames to be smoothed is determined on the basis of determination about motion of an input image and determination about motion of previous frames, and correction values corresponding to the determined number of frames are smoothed. In FIG. 3, components having the same functions as the first exemplary embodiment illustrated in FIG. 1 are denoted by identical reference numerals, and description is not repeated here.

A correction value calculating unit 20 calculates a correction value based on a histogram. In this example, similar to the first exemplary embodiment, a highlight value LH, and a shadow value LS are calculated, but the present invention is not limited to this calculation. A correction value memory 21 stores a correction value calculated by the correction value calculating unit 20 and a result of determination made by the motion determination unit 5. The correction value memory 21 can store correction values corresponding to N (N≧2) frames of an input image. That is, the memory stores correction values of up to an (N−1)th frame previous to the input image and motion determination results. A correction value smoothing unit 22 reads correction values corresponding to the number of frames determined by the smoothed frame number determination unit 6, from the correction value memory 21, adds the read values and divides the addition result by the number of frames to be smoothed. Thus, the correction value smoothing unit 22 performs smoothing.

Figure 4:
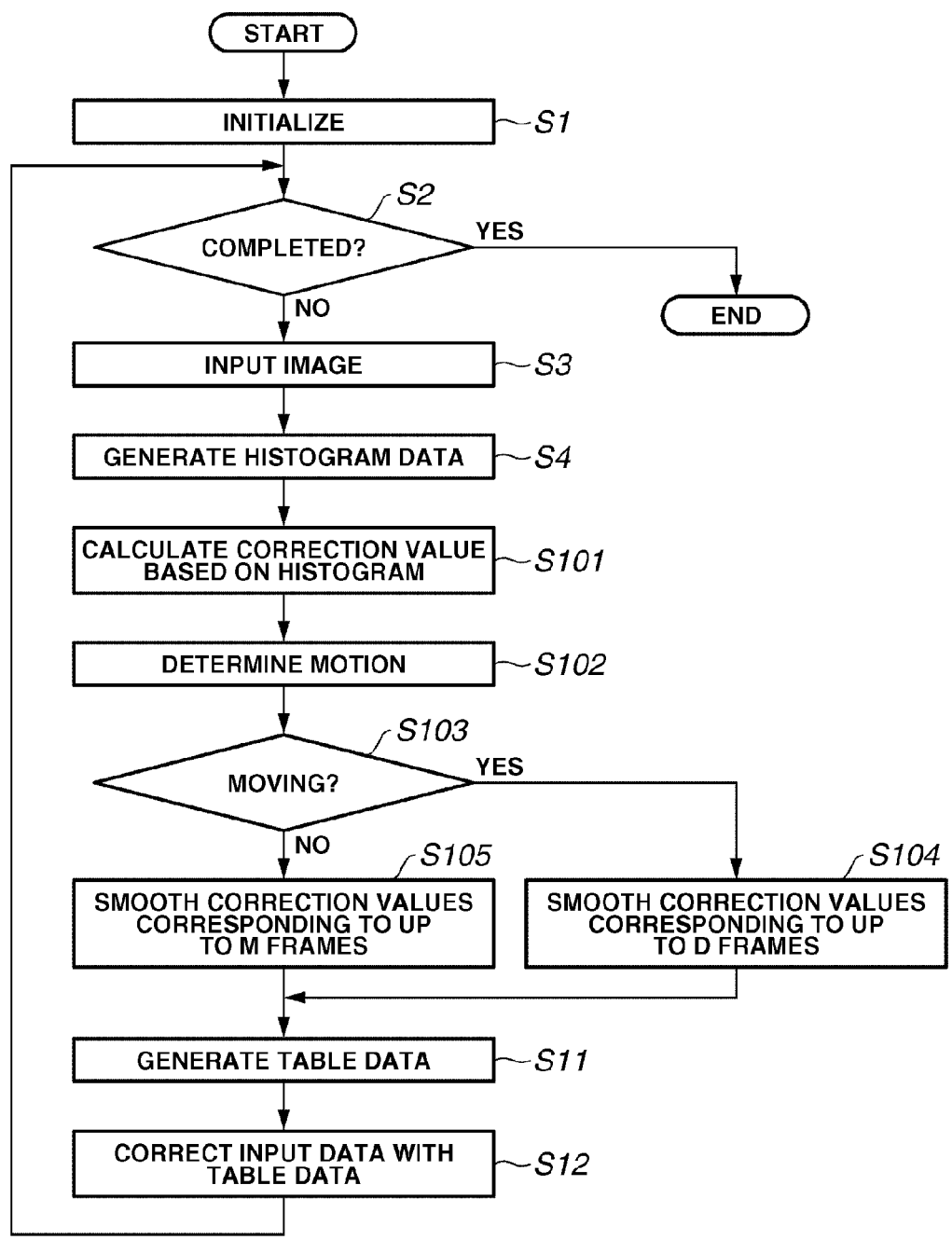
FIG. 4 is a flowchart illustrating image correction processing according to the second exemplary embodiment of the present invention.

FIG. 4 is a flowchart illustrating image processing according to the second exemplary embodiment. In FIG. 4, components having the same functions as the first exemplary embodiment shown in FIG. 2 are denoted by identical reference numerals, and description is not repeated.

In steps S1 to S4, similar to the first exemplary embodiment, frame data of a moving image input from the input terminal 12 is stored in the frame memory 1. The histogram generating unit 3 generates a histogram.

In step S101, the correction value calculating unit 20 calculates a highlight value LH and a shadow value LS, similar to the correction value calculating unit 8 of the first exemplary embodiment. The calculated correction value is input into the correction value memory 21.

In step S102, the motion determination unit 5 determines whether the input image is in a moving state or motionless state, similar to the first exemplary embodiment.

The result of determination made by the motion determination unit 5 is input into the correction value memory 21 and the smoothed frame number determination unit 6.

The correction values calculated by the correction value calculating unit 20 and the result of determination made by the motion determination unit 5 are stored in a predetermined area of the correction value memory 21. That is, the motion determination result, for example, "1" for the moving state and "0" for the motionless state are stored together with a highlight value, a shadow value, or the like. For ease of illustration, the maximum possible number of frames N to be stored in the correction value memory 21 is set to "5", but the present invention is not limited to this value.

In step S103, if it is determined that the input image is in a moving state, the processing advances to step S104. If it is determined that the input image is not in a moving state, the processing advances to step S105.

The smoothed frame number determination unit 6 determines the number of frames to be smoothed by the correction value smoothing unit 22. If the motion determination unit 5 determines that the input image is in a moving state, the number of frames to be smoothed is set to be D. If the motion determination unit 5 determines that the input image is in a motionless state, the number of frames to be smoothed is set to be M.

In step S104, correction values corresponding to D frames among the correction values in the correction value memory 21 are input into the correction value smoothing unit 22 and smoothed.

The correction value smoothing unit 22 adds input correction values of images corresponding to D frames which are in the same moving state as the motion determination about an input image, and averages and smoothes the added value. Alternatively, if correction values of an image include those in a motionless state, correction values of images up to a frame immediately before the image in a motionless state which goes back from the input image, are averaged.

However, if a number of correction values stored in the correction value memory 21 is less than D frames, correction values corresponding to the number of stored frames are used for smoothing. As an example, a highlight value is described. The smoothed correction value $LH_{TP}$ is obtained by a following expression where $LH_T$ represents a correction value when an image of a T-th frame is input.

$$LH_{TP} = (\Sigma^{T}_{t=(T-d+1)} LH_{tP})/d \qquad (5)$$

where if D frames or more are stored: d=D;

if less than D frames are stored: d=the number of stored frames

On the other hand, if the input image is determined to be in a motionless state in step S103, the number of frames to be smoothed is M. In step S105, correction values of M frames are input into the correction value smoothing unit 22, and the correction values are added, averaged, and smoothed. Also in this case, input correction values of images corresponding to M frames which are in the same motionless state as the motion determination about an input image, are added, averaged, and smoothed.

Alternatively, if a correction value includes an image in a moving state, correction values of images up to a frame immediately before the image in a moving state which goes back from the input image are averaged. However, if a number of correction values stored in the correction value memory 21 is less than M frames, correction values corresponding to the number of stored frames are used for smoothing. That is, the smoothed correction value $LH_{TP}$ is obtained by a following expression.

$$LH_{TP} = (\Sigma^{T}_{t=(T-m+1)} LH_{tP})/m \quad (6)$$

where if M frames are stored: m=M;
if less than M frames are stored: m=the number of stored frames In step S11, the smoothed correction value (from step S104 or S105) is input into the LUT generating unit 9, and a relation between an input value and a corrected image value is summarized into table data.

In step S12, the generated table data is input into the correction unit 10. The correction unit 10 corrects an image input from the frame memory 1 in accordance with the input table data. Finally, data in the frame memory 11 is output from the terminal 13, and data in the frame memory 1 is transferred to the frame memory 2.

Through these series of operations, favorable effects similar to the first exemplary embodiment can be attained.

Third Exemplary Embodiment

Figure 5:
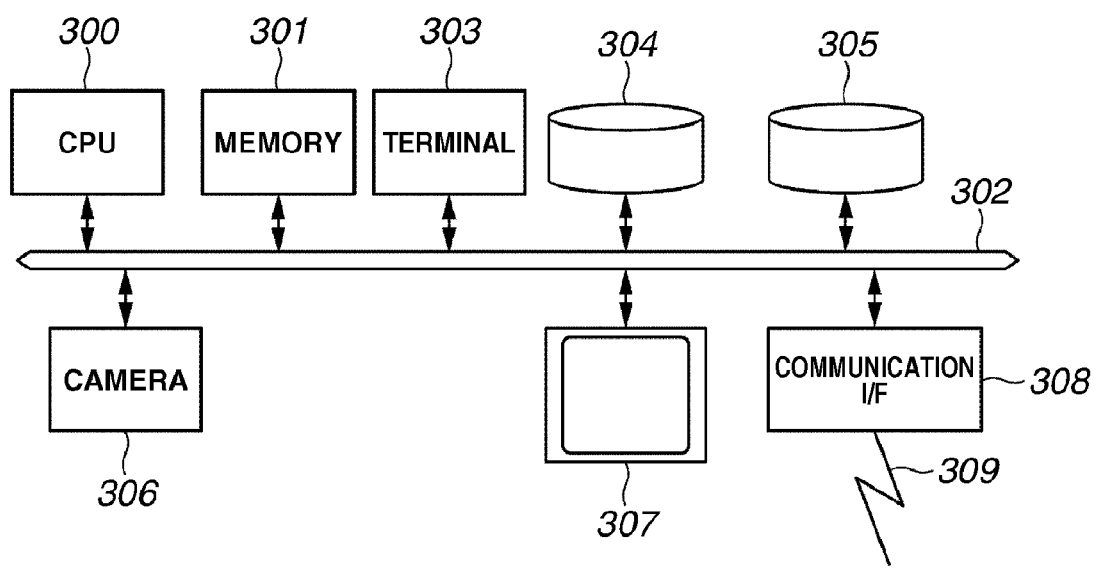
FIG. 5 is a block diagram illustrating an exemplary configuration of an image processing apparatus according to a third exemplary embodiment of the present invention.
Figure 6:
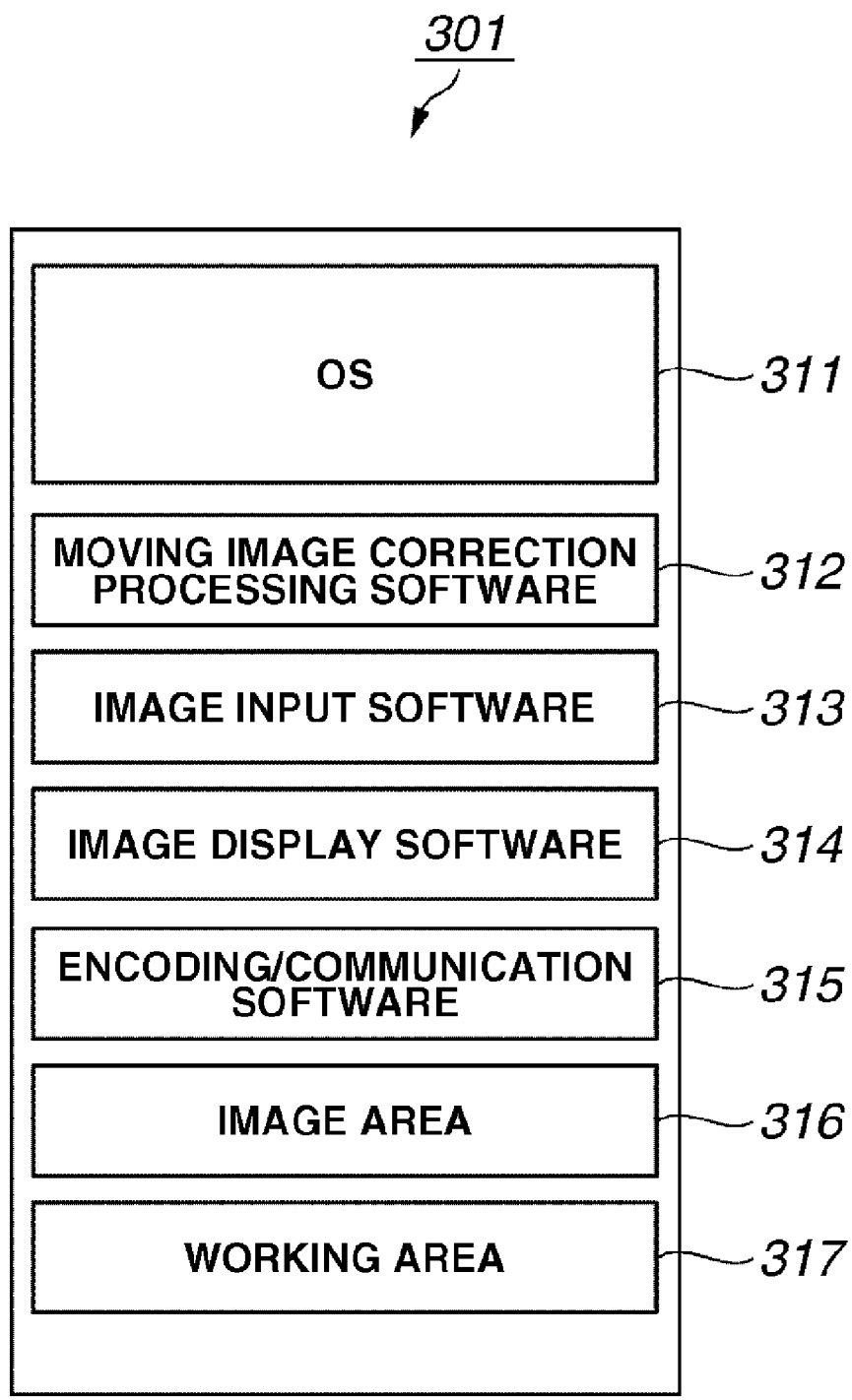
FIG. 6 is a diagram for illustrating a storing state of a memory.

FIG. 5 is a block diagram illustrating an example of a configuration of an image processing apparatus according to a third exemplary embodiment of the present invention. In FIG. 5, a central processing unit (CPU) 300 controls the apparatus and executes various kinds of processing. A memory 301 is a memory area of an operating system (OS) and software necessary for controlling the apparatus and computation. A bus 302 connects various kinds of devices and enables them to exchange data and control signals with each other. A terminal 303 sends an instruction to activate an apparatus, set various conditions, and play back an image. A storage device 304 stores software components. A storage device 305 stores encoding data or image data. The storage devices 304 and 305 can be configured of a medium that can be disconnected from a system and carried by a user. A camera 306 captures a moving image on a frame-by-frame basis. A monitor 307 displays an image. A communication circuit 309 includes a local area network (LAN), a public line, a wireless line, and broadcasting radio. A communication interface 308 transmits/receives encoding data through the communication circuit 309. For ease of illustration, each color has gradation of 8 bits/pixel, but the present invention is not limited to this gradation As shown in FIG. 6 the memory 301 stores an operating system (OS) 311 for controlling the overall apparatus and driving various kinds of software 312 to 315. In addition, the memory 301 stores an image area 316 for storing images and a working area 317 for storing parameters for various computation and encoding.

Now, image correction processing in the above configuration according to the present exemplary embodiment will be described.

Prior to the processing, an instruction to activate the overall apparatus is sent from the terminal 303 to initialize the apparatus. Then, the software stored in the storage device 304 is expanded to the memory 301 via the bus 302 and operation is started.

FIG. 6 illustrates how the memory 301 is used and data is stored. The memory 301 stores the OS 311 that controls the overall apparatus, and executes various kinds of software and the moving image correction processing software 312 for image correction processing. Moreover, the memory stores the image input software 313 for controlling the camera 306 to input a moving image on a frame-by-frame basis, and the image display software 314 for displaying an image on the monitor 307.

In the above configuration, first, an area H[255] for storing a histogram, an area L[255] [N] for storing table data of N frames, and an area L0[255] for storing table data used to correct an image are reserved in the working area 317 of the memory 301.

Further, an area IM0 for storing one frame of an image captured by the camera 306, an area IM1 for storing an image of an immediately preceding frame, and an area IM2 for storing an output image are reserved in the image area 316.

Next, the image input software 313 in the memory 301 is started to capture an image on a frame-by-frame basis with the camera 306 and store the image in the area IMO of the image area 316. Further, an image stored in the storage device 305 can be stored in the area IMO of the image area 316. Next, the image display software 313 is started, and when image data is stored in the area IM2 of the image area 316, the image is displayed on the monitor 307. Then, the image display software 313 displays stored images one after another.

Figure 7:
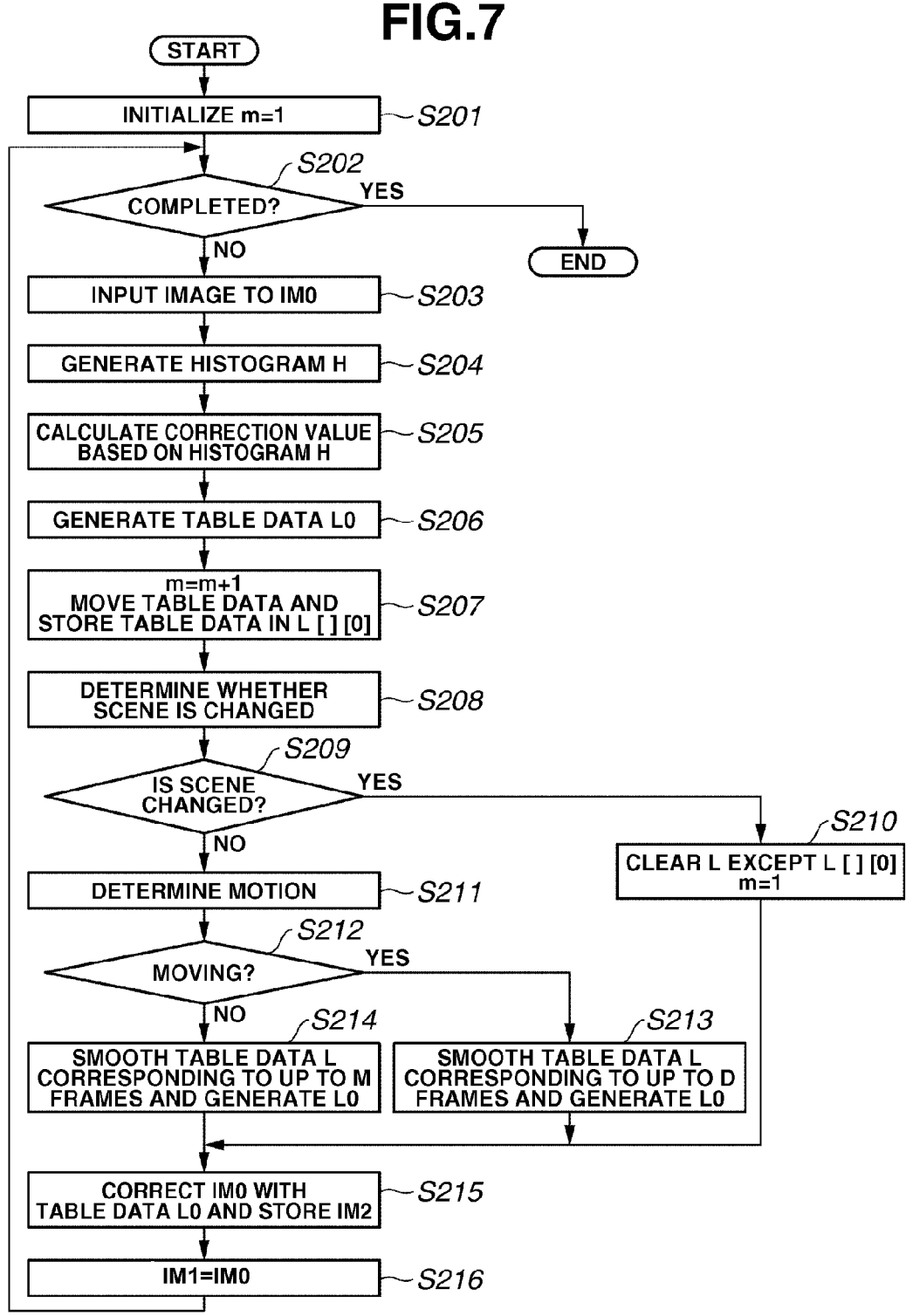
FIG. 7 is a flowchart illustrating image correction processing according to the third exemplary embodiment of the present invention.

Next, the moving image correction processing software 312 is started. The image correction processing executed by the CPU 300 is described referring to a flowchart illustrated in FIG. 7.

First, in step S201, each memory area is cleared to be 0 for initialization. In addition, 1 is assigned to a variable m.

In step S202, if a completion instruction to exit a program is sent from the terminal 303, the reserved areas are released and the processing ends. Otherwise, if the initialization is not completed, the processing advances to step S203.

In step S203, an image is stored in the area IM0 of the image area 316 in the memory 301 by the image input software 313.

In step S204, all data of histogram H[ ] is first cleared to be 0. Next, luminance values of image data stored in the area IM0 are read out to generate a histogram. If the input luminance value is p, "1" is added to H[p].

In step S205, correction values are calculated based on the histogram H[ ] and stored in the working area 317 of the memory 301.

In step S206, table data is generated on the basis of the correction values stored in the working area 317 and stored in the table data L0[ ] of the working area 317 of the memory 301.

In step S207, the table data L is moved, and "1" is added to the variable m. If the variable m exceeds N, N is assigned to the variable m. If the variable m is equal to or smaller than N, that is the number of frames to be stored, table data L[ ] [v−1] is stored in table data L[ ] [v] (v=1 . . . n−1). Even if any value is set in the table data L[ ][N−1], the value is overwritten and is not saved. Finally, the table data L0[ ] obtained in step S206 is copied to the table data L[ ][0].

In step S208, a previous image stored in the area IM1 of the image area 316 of the memory 301 is compared with image data stored in the area IM0 to detect scene change. Various methods have been already discussed for detecting the scene change, and any method can be used. If the scene change is detected, a variable C is set to "1". If the scene change is not detected, variable C is set to "0".

In step S209, if the variable C is "1" (scene has changed), the processing advances to step S210. On the other hand, if the variable C is "0" (scene has not changed), the processing advances to step S211.

In step S210, the table data L[ ] [1] to the table data L[ ] [N−1] are cleared to be "0". Further, "1" is assigned to the variable m, and the processing advances to step S215.

In step S211, motion determination is carried out. If image data stored in the area IM0 is determined to be in a moving state, a variable V is set to "1". If image data stored in the area IM0 is determined to be in a motionless state, variable V is set to "0".

In step S212, if the variable V is "1" (moving state), the processing advances to step S213. On the other hand, if the variable V is "0" (motionless state), the processing advances to step S214.

In step S213, the table data is smoothed to generate table data L0[ ]. If the variable m is larger than D, smoothing is performed with D frames. If the variable m is not larger than D, smoothing is performed with m frames, and table data L0[ ] is generated.

After the table data L0[ ] is generated, the processing advances to step S215.

In step S214, the input frame is determined to be in a motionless state, so that table data generated with m (variable) frames is smoothed to generate table data L0[ ] based on a following expression.

$$L0[j] = (\Sigma_{t=0}^{m} L[j][t])/m \quad (7)$$

After the table data L0[ ] is generated, the processing advances to step S215.

In step S215, a pixel value of an image stored in the area IM0 is converted in accordance with the table data L0[ ] and stored in the area IM2. The pixel value is converted in accordance with a following expression, where a k-th pixel value of an input image is represented by IM0[$k$], and a pixel value to be output is represented by IM2[$k$]:

$$IM2[k] = L0[IM0[k]] \quad (8)$$

In step S216, data about an image stored in the area IM0 on the image area 316 of the memory 301 is stored in the area IM1, and the processing advances to step S202 to process the next frame.

Owing to these series of operations, in addition to the effects similar to the first exemplary embodiment, it is possible to perform correction that is more precise because table data obtained before a scene changes is not referenced when the scene changes.

While, according to the present exemplary embodiment, an image captured with the camera 306 is corrected, corrected image data can also be stored in the storage device 305. Alternatively, image data stored in the storage device 305 can be corrected and then displayed on the monitor 307. Further, the encoding/communication software 315 can be activated to encode image data in the image area 316 and transmit the encoded data to the communication line 309 through the communication interface 308.

Further, similar effects can be achieved if a histogram obtained before the scene changes is not referenced in the first exemplary embodiment or if a correction value obtained before the scene changes is not referenced in the second exemplary embodiment upon the scene change.

Figure 8:
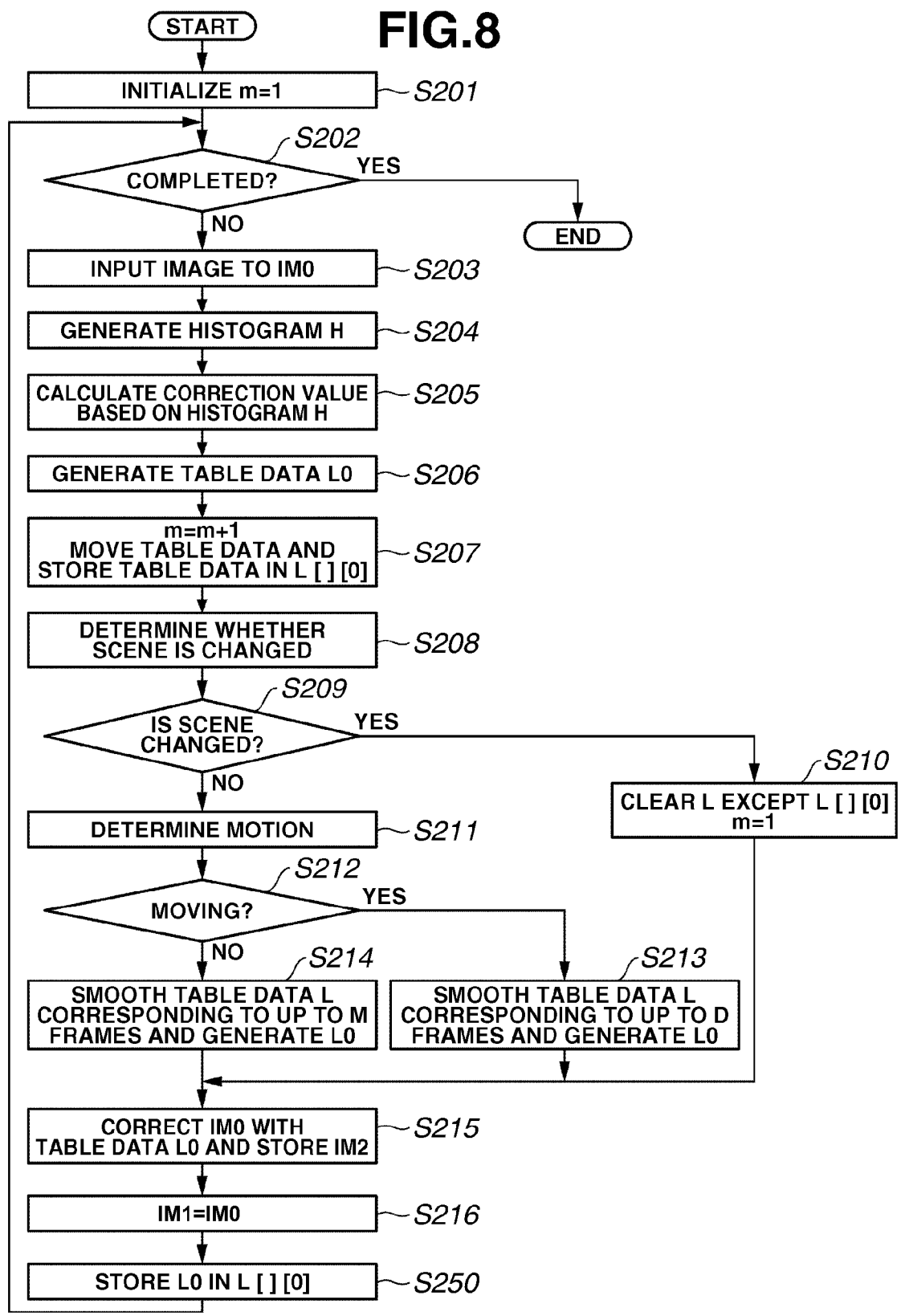
FIG. 8 is a flowchart illustrating an example of modified image correction processing according to the third exemplary embodiment of the present invention.
Figure 9:
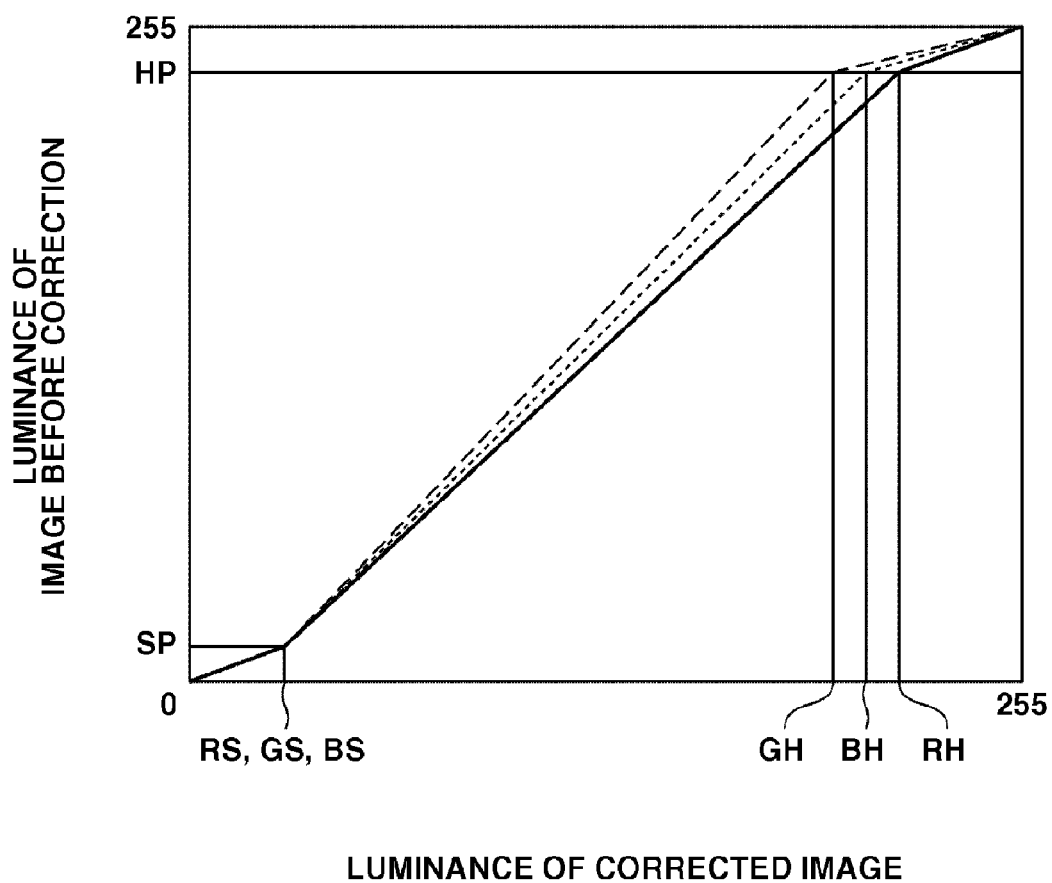
FIG. 9 is a diagram illustrating a look-up table used in image correction processing of the related art.

Further, operations of the image correction processing in the present exemplary embodiment can be changed as illustrated in FIG. 8. That is, in step S250 after step S216, the table data L0[ ] can be stored in the table data L[ ] [0] of the memory 301 to process the next frame.

Other Exemplary Embodiment

While, according to the exemplary embodiment of the present invention, the histogram of the luminance value is generated, a histogram of each color, for example, R (red), G (green), and B (blue) can also be used. In addition, according to the exemplary embodiment of the present invention, all luminance values are necessary for the histogram, but a quantization unit can also be used to generate a histogram of a quantization result.

Further, different smoothing methods can be used in a moving area and a motionless area. That is, as for the motionless area, a histogram, a correction value, or table data corresponding to M frames previous to the motionless area is smoothed. As for the moving area, a histogram, a correction value, or table data corresponding to D (M>D) frames previous to the moving area can be smoothed.

Program code (software) that realizes the above exemplary embodiments is supplied to a computer (CPU or MPU) in the above system or apparatus, and the computer in the system or apparatus operates various devices in accordance with the program code.

In this case, the software program code itself executes functions of the exemplary embodiments. That is, the program code itself and means for supplying the program code to the computer, for example, a storage medium that stores the program code, is included in the present invention.

Examples of the storage medium for storing the program code include a floppy disk, a hard disk, an optical disk, a magneto optical disk, a CD-ROM, a magnetic tape, a nonvolatile memory card, and a ROM.

Further, the computer controls various devices in accordance with the supplied program code to execute the functions of the above exemplary embodiments. Besides, the present invention encompasses a program code that realizes the above exemplary embodiments in association with an operating system (OS) running on the computer, or other application software.

Further, based on an instruction of the program, the CPU provided on the feature expansion board or the feature expansion unit can execute part or all of the processing so that the functions of the above-described embodiments can be realized.

As described above, the image processing apparatus according to the exemplary embodiments of the present invention can suppress flickering and perform appropriate correction in accordance with motion of a moving image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-346195 filed Dec. 22, 2006, which is hereby incorporated by reference herein in its entirety.

What is claimed is:

1. An image processing apparatus comprising:
an input unit configured to input a moving image on a frame-by-frame basis;
a feature quantity calculating unit configured to calculate feature quantity of the input image;
a storing unit configured to store the feature quantity corresponding to a plurality of frames;
a motion determination unit configured to determine whether an object of the input image is moving or motionless;
a smoothing unit configured to smooth feature quantity of a plurality of images in accordance with a result of determination made by the motion determination unit; and
an image correcting unit configured to correct the input image in accordance with an output from the smoothing unit,
wherein if it is determined by the motion determination unit that the input image is in a moving state, the smoothing unit smoothes feature quantity with a smaller number of frames than if it is determined by the motion determination unit that the input image is in a motionless state.

2. The image processing apparatus according to claim 1, wherein the plurality of images are consecutive frames.

3. The image processing apparatus according to claim 1, wherein the motion determination unit calculates a difference in a plurality of consecutive images and performs determination based on the difference calculated.

4. The image processing apparatus according to claim 1, wherein the feature quantity calculating unit calculates a luminance histogram of the input image as feature quantity.

5. The image processing apparatus according to claim 1, wherein the feature quantity calculating unit calculates a correction value based on a luminance histogram of the input image as feature quantity.

6. The image processing apparatus according to claim 1, further comprising a table generating unit configured to generate table data of a correction value used in the image correcting unit,
wherein the image correcting unit corrects an image based on the table data.

7. The image processing apparatus according to claim 1, further comprising a scene change detecting unit configured to detect scene change in the input image,
wherein the smoothing unit smoothes the feature quantity based on a result of the scene change detection.

8. The image processing apparatus according to claim 7, wherein the smoothing unit abandons feature quantity of a plurality of images held in the storing unit if the scene change is detected.

9. An image processing method comprising:
inputting a moving image on a frame-by-frame basis;
calculating feature quantity of the input image;
determining whether an object of the input image is moving or motionless;
smoothing feature quantity of a plurality of images in accordance with a result of the determination of whether the object of the input image is moving or motionless; and
correcting the input image in accordance with a result of the smoothing,
wherein if it is determined that the input image is in a moving state, the smoothing step smoothes feature quantity with a smaller number of frames than if it is determined that the input image is in a motionless state.

10. A non-transitory computer-readable storage medium that stores computer-executable instructions that causes a computer to execute the image processing method according to claim 9.

* * * * *